LINE CONNECTOR CIRCUIT ARRANGEMENT IN AUTOMATIC TELECOMMUNICATION SWITCHING SYSTEMS PARTICULARLY FOR TELEGRAPHIC EXCHANGES
Filed Nov. 29, 1965
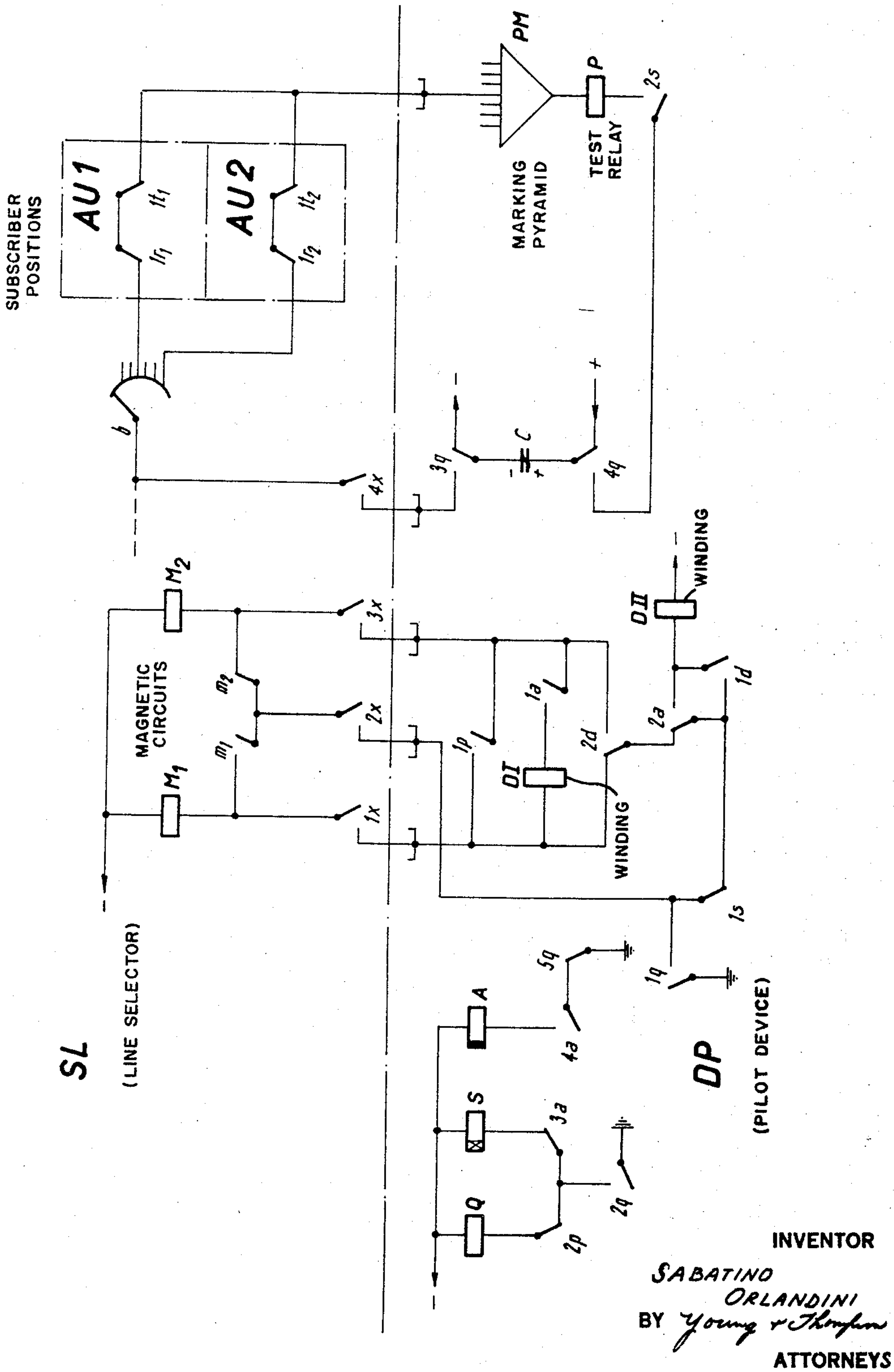
INVENTOR
SABATINO ORLANDINI
BY Young & Thompson
ATTORNEYS United States Patent Office 3,412,212

Patented Nov. 19, 1968

3,412,212

LINE CONNECTOR CIRCUIT ARRANGEMENT IN AUTOMATIC TELECOMMUNICATION SWITCHING SYSTEMS PARTICULARLY FOR TELEGRAPHIC EXCHANGES

Sabatino Orlandini, Milan, Italy, assignor to Societa Italiana Telecomunicazioni Siemens S.p.A.

Filed Nov. 29, 1965, Ser. No. 510,259
Claims priority, application Italy, Nov. 27, 1964, 25,590/64
4 Claims. (Cl. 179—18)

ABSTRACT OF THE DISCLOSURE

A circuit arrangement for selective line connectors controlled by marking circuits through a central station in an automatic telecommunication switching exchange comprises a line connector and means for stepping said line connector at least one step during the period between the end of a seizure of a line and the closing of a marking circuit for the next line seizure.

This invention relates to a circuit arrangement for line selectors, that is, selective line connectors, controlled by centralized devices placed in switching exchanges, particularly in telegraphic exchanges, wherein the line selector is disposed so that it is caused to rotate one or more steps without engagement during the time occurring between the end of a seizure and the closing of the marking circuit for the next seizure.

An object of the present invention is to provide a circuit arrangement for line selectors, controlled by markers in automatic telecommunication exchanges, particularly in telegraphic exchanges whereby it is possible to seize another line which is still available on the multiple, when one or more lines of said multiple are faulty.

In switching arrangements comprising marker-selectors, and particularly in telegraphic switching exchanges of this type, the last stage of a connection is established by line selectors which use a temporary association with pilot devices, centralized with respect to the selectors. When a number of a multiple is dialed, the pilot device marks simultaneously all the free lines belonging to that multiple and causes the line selector arm to rotate, initiating the hunting process and stopping on the first marked line, making that line busy.

If the subscriber-set connected to the seized line is defective, the established connection is made free and the calling subscriber receives the signal "DER" to indicate that the called subscriber connection is faulty.

The call coming from the calling subscriber is repeated as the multiple may include other positions showing normal working conditions.

When a new trial is repeated it is probable that the same route is chosen and the same line selector seized, because the origin and the destination of the call is not changed. The line selector, already positioned on the faulty line, usually stays there and holds the same line busy. This condition may recur many times, particularly during the low traffic period, thereby not allowing the use of the desired multiple though other positions of the multiple are in regular working condition.

A known solution of this problem provides for holding the line selector on the line revealed faulty and also to make the line busy after the calling subscriber has received the signal "DER." The line selector stopped on the faulty line also provides for sending an alarm to the supervising operators.

The above solution presents some drawbacks. In fact, when a single position whose uniline is blocked by a selector, which previously found it fautly, is called, the calling subscriber receives the signal "OCC," indicating calling subscriber busy. This wrong information causes the calling subscriber to repeat the short distance connection, determining a non-useful load for the switching members, particularly for those centralized.

Another imperfection of such solution resides in the fact that when a temporary failure occurs in a whole multiple (for instance: lack of supply to the subscriber set), the line selector seizes a line for each call to the faulty position, and therefore all the line positions may be blocked during that period and hold this condition even after the elimination of the trouble (for instance: after return of supply), and until the supervising operators restore the normal conditions. Moreover this latter solution requires particularly expensive line selectors.

It is proposed, by the present invention, to overcome the above-described problems of the prior art when one or more positions of the desired multiple are defective, and reaching another position still available by using a circuit arrangement wherein the line selector arm is caused to rotate one or more steps without engagement during the time occurring between the end of a seizure and the closing of the marking circuit for the next seizure. Preferably, the steps without engagement should be made by the selector before the marking circuit is closed, namely when the progressing circuits of the selector are already partially predisposed to hunt for the marked circuit. In this manner it is possible to position the line selector arm on a faulty line of a multiple; however when the arm is seized again for a connection in the same multiple, it is moved forward from the faulty line, testing all the other free lines. Moreover, since a faulty line is not set in blocking condition by a line selector (contrary to what happens, in the well-known manner, for a line selector testing for a faulty line), the calling subscriber always receives the correct reply, the signal "DER" and, if the trouble is temporary (for instance: lack of supply), the line comes back free automatically and instantaneously when the trouble is eliminated.

In accordance with a further feature of the invention, the circuit arrangement for the progress of the line selectors before marking is provided inside the pilot devices and offers many advantages, because these devices are centralized with respect to the line selectors.

Further objects and advantages of this invention will become apparent with reference to a non-limitative example of a preferred embodiment, with reference to the attached drawing, in which:

FIGURE 1 shows a simplified diagram of the circuits comprising only the elements required for the understanding of the invention.

The present example concerns a circuit arrangement constructed inside the pilot devices, by means of which the line selectors perform only one step before the marking circuit is closed.

In the upper part of the figure are represented the motor circuits and the associated rotary arm with the relative bank of contacts of a line selector (SL) of motor type; two outlets are represented in the bank of contacts going to two subscriber's positions ($AU_1$ and $AU_2$) of the same multiple.

In the lower part of the figure are represented the pilot device circuits DP which provide for the progress of the line selector before and after marking of the called subscriber position.

When the line selector SL is seized according to a well-known method by a group-selector (not shown), the former is connected by means of relay X, which is represented by contacts 1$x$ to 4$x$ thereof, to the pilot device DP, where relay A is energized and holds through the following circuit:

(1) ground, 5$q$, 4$a$, A.

When the pilot device receives the last two digits of the called multiple, the marking pyramid PM activates one of its marking outlets, thus establishing a connection between the test relay P and the marking outlet connected to the available circuits of the two subscriber's positions ($AU_1$ and $AU_2$) (Wherein are included respectively contacts 1$r_1$, 1$t_1$ and 1$r_2$, 1$t_2$) of the called multiple.

The relay Q is next energized (not shown) and holds through the circuit:

(2) ground, 2$q$, 2$p$, Q.

The energy is supplied to the motor inside SL but, as well-known, it does not start because in both magnetic circuits $M_1$ and $M_2$ currents flow in opposition through the following circuits:

(3) ground, 1$q$, 2$x$, $m2$, $M_2$,— and (4) ground, 1$q$, 2$x$, $m_2$, 3$x$, 1$a$, DI, 1$x$, $M_1$.

Relay A, delayed in releasing, does not release immediately when circuit 1 is open due to the excitation of relay Q. The former relay holds during the time required for eventual excitation of relay D. This latter relay in fact is excited when contacts $m_1$ and $m_2$ of the motor are in the position indicated in FIGURE 1, (corresponding for instance, to odd steps of the selector), because current flows through windings of $M_1$ and $M_2$ in the same direction; in the winding DI through circuit 4 and in the winding DII through the following circuit:

(5) ground, 1$q$, 1$s$, 2$a$, DII.

If the selector, for instance, should be positioned on even step, so that contacts $m_1$ is closed and $m_2$ open, the relay D, therefore, will not be excited because in its winding DI the current flows in the opposite direction with respect to that of winding DII, in the following circuit:

(6) ground, 1$q$, 2$x$, $m_1$, 1$x$, DI, 1$a$, 3$x$, $M_2$.

When the relay A is released and circuits 4 and 5 or 6 are open, the relay D, if operated, holds in the following circuit:

(7) ground, 1$q$, 1$s$, 1$d$, DII—

At the same time, the circuit 4 will open and magnetic circuit $M_1$ will no longer be excited, while $M_2$ is still excited in the circuit 3; therefore, as well-known, the motor is started causing the stepping of the line selector. When the selector advances one step, motor contact $m_1$ is closed and $m_2$ is open. The current through winding of $M_1$ then flows through the following circuit:

(8) ground, 1$q$, 2$x$, $m_1$, $M_1$.

Also if contact $m_2$ should be open and therefore the circuit 3 open, magnetic circuit $M_2$ is still excited in the following circuit:

(9) ground, 1$q$, 1$s$, 2$a$, 2$d$, 3$x$, $M_2$, therefore the motor stops.

The relay A having been released, the relay S, delayed in the operation, will be excited through the following circuit:

(10) ground, 2$q$, 3$a$, S.

The delay-time of relay S is adjusted to be greater than the time required to perform one step by line-selector. Therefore, when SL will perform only one step, the relay S operates, opening circuit 9 by its contact 1$s$. The magnetic circuit $M_1$ will still be operated and the motor will be revolving in the usual manner by alternative operation of magnetic circuits $M_1$, $M_2$, through the alternate operations of contacts $m_1$, $m_2$.

When the line selector movable-arm $b$ finds the first marked line, for instance that going to $AU_1$, the following circuit is established:

(11) capacitor C—, 3$q$, 4$x$, arm $b$, 1$r_1$, 1$t_1$, marking pyramid PM, P, 2$s$, 4$q$, C+. Capacitor C previously charged, now discharges in the circuit 11, because relay Q is not yet operated, in the following circuit:

(12) +, 4$q$, C, 3$q$.

Therefore relay P is operated and its contact 1$p$ supplies current to both magnetic circuits $M_1$ and $M_2$, regardless of the reached position, or regardless of the position of contacts $m_1$, $m_2$; the selector will be stopped on the marked position. Contact 2$p$ instead will open the circuit of relay Q through the following circuit:

(13) ground, 2$q$, 2$p$, Q, and relay Q releases preventing the current from flowing through the motor by its contact 1$q$. The contacts 3$q$ and 4$q$, now in rest position, connect capacitor C to polarities + and − of exchange battery and the capacitor will be charged ready for marking another line. The selector, stopped on the reached step, is provided to send, in the well-known manner, ringing current to the point connected to the subscriber's position AU1.

If the point connected to AU1 position should be failed, the connection is made free in the well-known manner after having sent the signal DER to the subscriber.

When the call to the multiple is repeated and the same line selector is seized, the operations are as described above from (1) to (9). In this case it will be noted that the selector, when performing the first step, leaves the outlet connected to position AU1, over which it was positioned by the previous seizure. When relay S operates and the selector is caused to rotate, its marking arm $b$ starts hunting from the outlet next to that connected to AU1 and stops on the first marked outlet, which is that connected to AU2. The following circuit will close:

(14) Capacitor C—, 3$q$, 4$x$, arm $b$, 1$r_2$, 1$t_2$, marking pyramid PM, P, 2$s$, 4$q$, C+.

All the operations are identical as described from circuit 11 and following, deffering only by the different calling position on the multiple, namely, the point connected to the subscriber's position AU2.

The control circuit which causes the line selector to operate before the marking circuit, may be simplified, if it is not required by the selector to perform exactly only one step without engagement. In this case relays A and D will be eliminated from the schematic of FIGURE 1 and relay S will be connected directly to contact 2$q$. When the relay Q is energized, the selector starts its rotation and performs some steps, the marking circuit being open (contact $s_2$ open). This latter contact $s_2$ is closed only when the relay S operates. Relay S, delayed in operation, permits the selector to perform one step before relay S is closed and tests on the seized line. Operation limits for relays and selectors permit the marking circuit to be held open for some successive steps of the selector.

Therefore using this circuit arrangement, the lines going to the same multiple should be suitably spaced on the bank of the line selector, so that a selector arm, which was previously positioned on a faulty line of a multiple, again seized, may come on the next line of the same multiple when the marking circuit is already closed. Although the invention has been described above in connection with a specific embodiment, it must be understood that various changes and modifications may be made therein within the scope of the invention.

What I claim is:

1. A circuit arrangement for line connectors controlled by marking circuits through a central station in an automatic telecommunication switching exchange comprising a line connector and means for stepping said line connector at least one step during the period between the end of a seizure of a line and the closing of a marking circuit for the next line seizure.

2. A circuit arrangement, as claimed in claim 1 wherein said connector is not in engagement with said marking circuit during said time between the end of a seizure of a line and the closing of the marking circuit.

3. A circuit arrangement, as claimed in claim 2, said stepping means comprising a break device in the marking circuit, said break device holding said marking circuit open for the number of the desired steps without engagement.

4. A circuit arrangement, as claimed in claim 3, including a pilot device, characterized in that in the pilot device are included means for rotating the connector arm only one step without engagement and means for holding said arm stationary until other means close the marking circuit and cause the line connector arm to rotate again.

References Cited

UNITED STATES PATENTS

| | | | |
|---|---|---|---|
| 2,709,720 | 5/1955 | Schauer ----------- | 179—18.6 |
| 3,288,938 | 11/1966 | De Raedt et al. ------ | 179—18.6 |

KATHLEEN H. CLAFFY, *Primary Examiner.*

L. A. WRIGHT, *Assistant Examiner.*